United States Patent [19]

Nesseth

[11] Patent Number: 5,624,241

[45] Date of Patent: Apr. 29, 1997

[54] FLEXIBLE HYDRAULIC PUMP AND AGITATOR APPARATUS

[75] Inventor: Clinton A. Nesseth, Cameron, Wis.

[73] Assignee: NTH, Inc., Barron, Wis.

[21] Appl. No.: 212,031

[22] Filed: Mar. 11, 1994

[51] Int. Cl.[6] ................................................. F04B 17/06
[52] U.S. Cl. ........................ 417/234; 417/430; 417/431
[58] Field of Search ................................. 417/234, 231, 417/430, 431; 296/208

[56] References Cited

U.S. PATENT DOCUMENTS

| 3,008,422 | 11/1961 | Crisafulli | 417/234 |
|---|---|---|---|
| 3,170,026 | 2/1965 | Woodson | 174/15 |
| 3,687,311 | 8/1972 | Nesseth | 214/16 |
| 3,876,341 | 4/1975 | Nesseth | 417/515 |
| 3,905,725 | 9/1975 | Johnson | 417/231 |
| 3,981,635 | 9/1976 | Hedlund | 417/551 |
| 4,188,172 | 2/1980 | Talbert et al. | 417/431 X |
| 4,267,888 | 5/1981 | Singer | 417/431 X |
| 4,278,408 | 7/1981 | Rammer et al. | 417/551 |
| 4,293,282 | 10/1981 | Nesseth et al. | 417/53 |
| 4,416,590 | 11/1983 | Colucci | 417/231 |
| 4,439,115 | 3/1984 | Nesseth et al. | 417/460 |
| 4,440,231 | 4/1984 | Martin | 166/373 |
| 4,445,823 | 5/1984 | Zyduck | 417/430 |
| 4,594,006 | 6/1986 | Depeault | 366/266 |
| 4,616,979 | 10/1986 | Hynes et al. | 417/231 |
| 4,659,293 | 4/1987 | Evenson | 417/231 |
| 4,661,046 | 4/1987 | Ruyle | 417/203 |
| 4,685,868 | 8/1987 | Bodensteiner et al. | 417/405 |
| 4,836,687 | 6/1989 | Kardoes et al. | 366/286 |
| 4,924,898 | 5/1990 | Evenson | 137/566 |
| 4,971,526 | 11/1990 | Ruyle | 417/244 |
| 5,100,303 | 3/1992 | Depault | 417/361 |
| 5,330,332 | 7/1994 | Nesseth et al. | 417/440 |

OTHER PUBLICATIONS

NTH, Inc., flier entitled *20 Years Experience*.
NTH, Inc., flier entitled *N–Tech® Magnum Commercial Vertical PTO Pump*.
NTH, Inc., flier entitled *N–Tech® Lagoon Trail'r Pump*.

*Primary Examiner*—Richard E. Gluck
*Attorney, Agent, or Firm*—Merchant, Gould, Smith, Edell, Welter & Schmidt, P.A.

[57] ABSTRACT

An improved towed apparatus for pumping and/or agitating manure slurries is disclosed. The apparatus, which is configured for energization by a tractor's hydraulics and power take-off system, includes an elongate conduit beam member flexible along a center section and extending from the towing vehicle to a distally mounted pump and/or agitator. The conduit can be controllably raised to extend over obstacles, and bent along its flexible section to accurately position the pump or agitator in the slurry to be pumped. Hydraulic steering means are provided for accurately maneuvering the apparatus by a tractor, and cooling means which uses the material being pumped as a heat sink are provided for cooling the hydraulic fluid that energizes the pump or agitator.

19 Claims, 8 Drawing Sheets

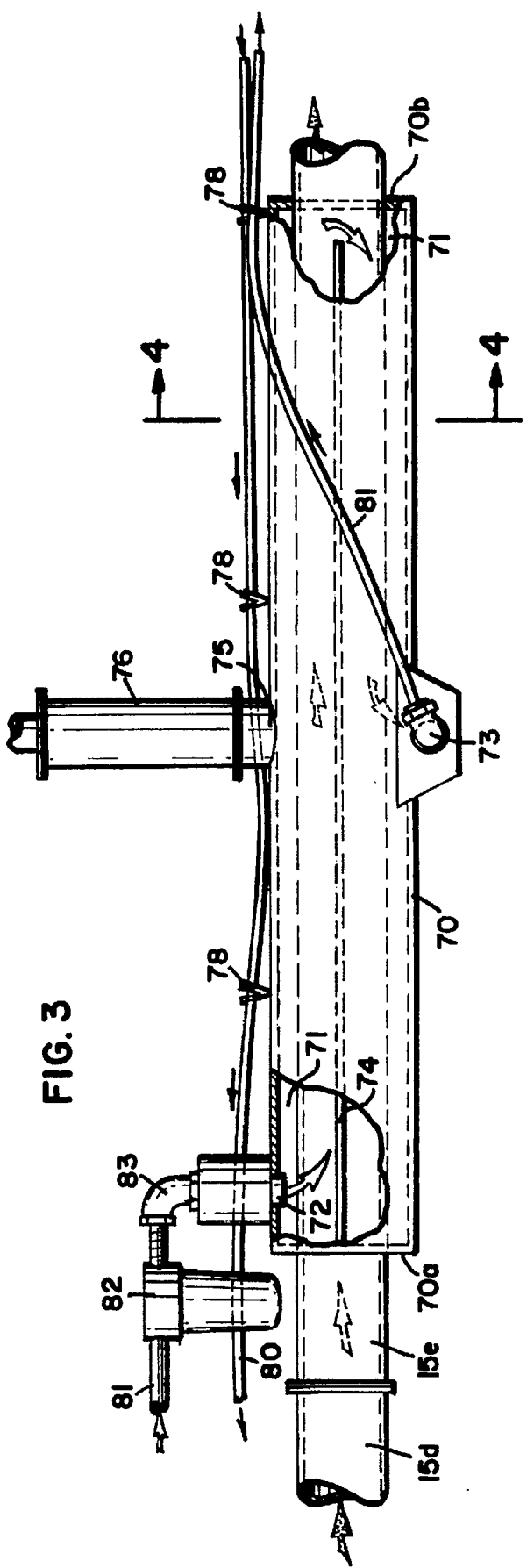

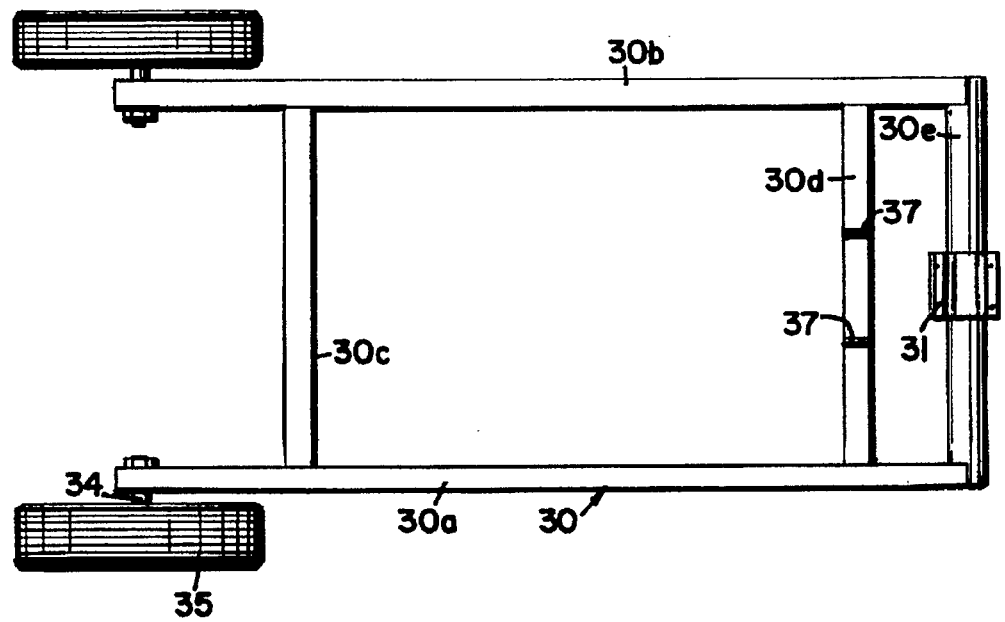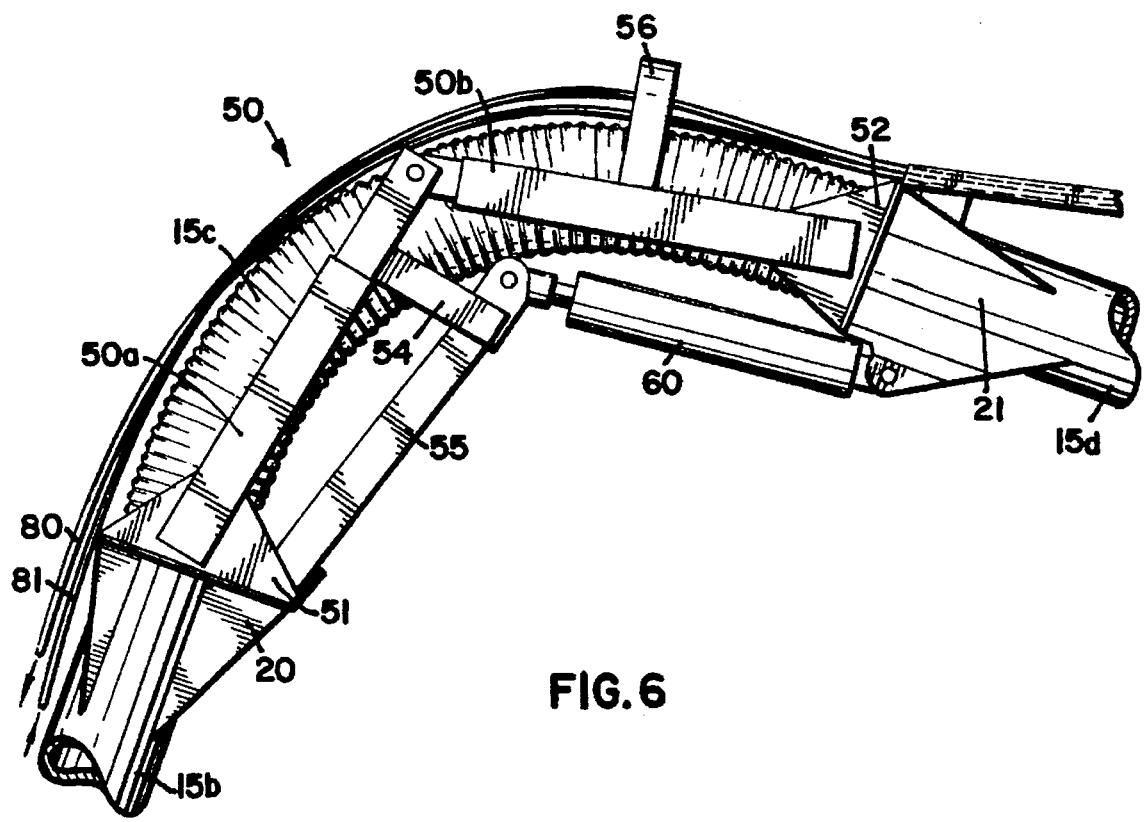

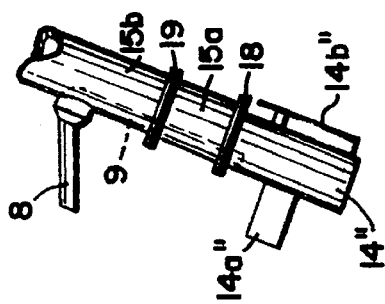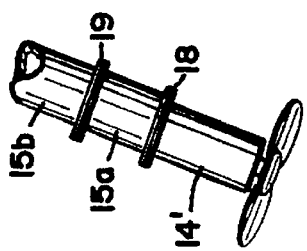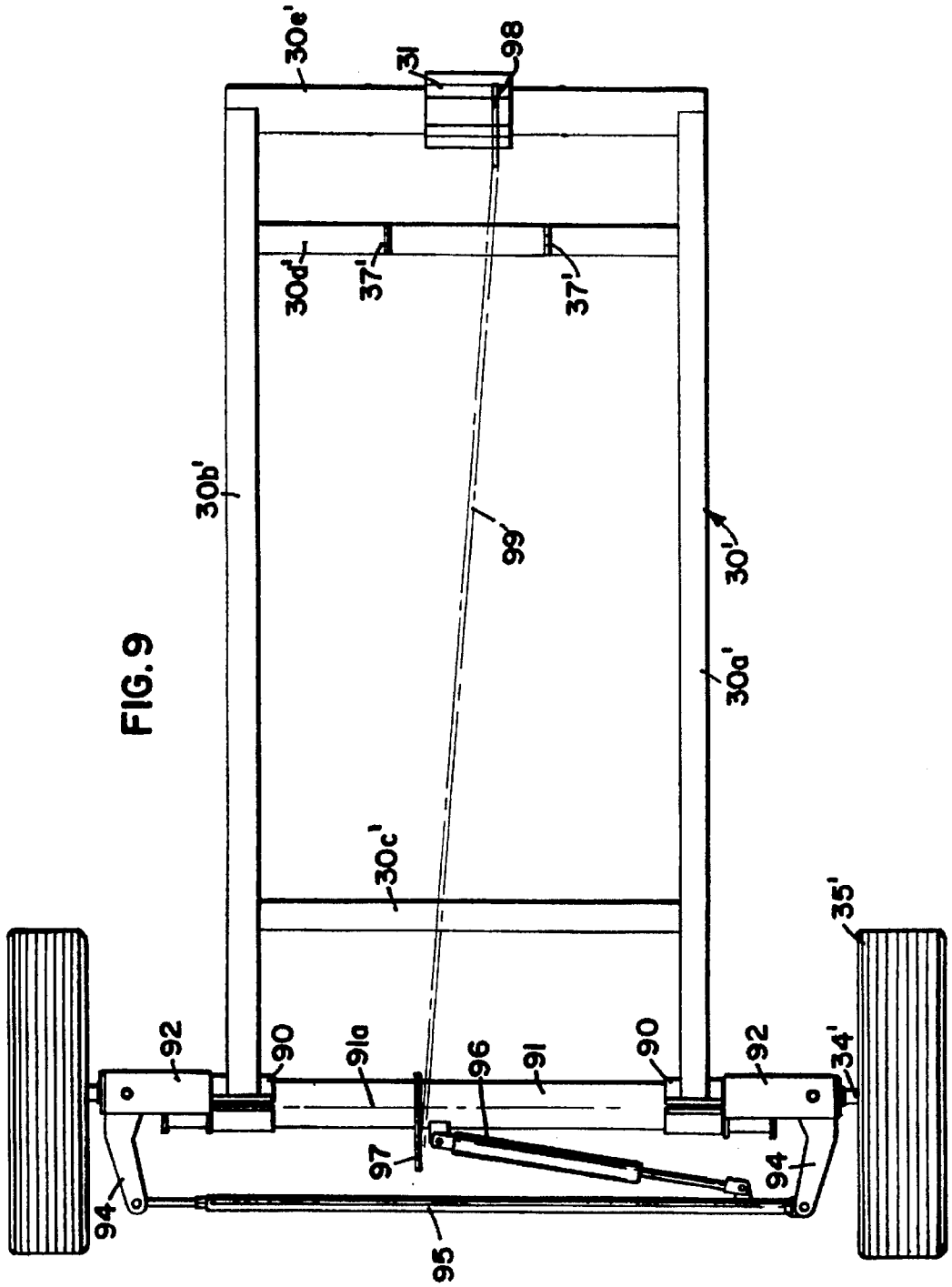

FLEXIBLE HYDRAULIC PUMP AND AGITATOR APPARATUS

FIELD OF THE INVENTION

This invention relates generally to slurry handling apparatus, and more specifically to an elongate trailable manure pump/agitator that can be flexibly raised, lowered and accurately maneuvered and operatively positional by means of a moveable axle assembly.

BACKGROUND OF THE INVENTION

It is common practice in farming for dairy farms and ranches to collect and store animal waste in large holding containers, pits or outdoor lagoons for subsequent use as fertilizer. The animal waste or manure is typically in the form of a semi-solid or slurry. The storage reservoirs typically are sized to store a season's worth of accumulated manure, for example a winter's collection for disbursing as fertilizer in the spring, and often are sized to store a 150–180 day accumulation. The storage reservoirs can be aboveground storage containers, but are typically built below grade in the form of pits or lagoons. They generally are from 8–10 feet deep and vary in peripheral configuration from round, to rectangular to irregular in shape. The sidewalls of such reservoirs also vary, from vertical sidewalls to sloped or banked sidewalls. The reservoirs are generally uncovered, and can present a danger to one walking near them, and are therefore typically surrounded by appropriate fencing or barricade structures.

The reservoir is typically supplied through an underground conduit extending from a remotely located barn or building. Manure is generally forced through the conduit by means of a piston-type pump located in the barn, as for example described by the inventor's prior U.S. Pat. Nos. 3,687,311, 3,876,341 and 4,439,115. The reservoir contents are typically removed from the pit by means of pumps that pump the manure to a mobile tank that is subsequently moved to a fertilizing site where the manure is disbursed by appropriate spreaders.

Over a period of time, the manure within the reservoir settles and separates, leaving a lower sediment and an upper liquid portion. Floatable solids also typically rise to the surface, forming an upper layer or crust, entrapping the liquid portion between the upper crust and the bottom sediment in the reservoir. The liquid portion can readily be handled by vacuum or auger assisted vacuum pumps connected to vacuum tanks, such as disclosed in U.S. Pat. No. 4,661,046. Generally, however, more universal hydraulically driven impeller pumps are used to withdraw the manure from such reservoirs. Also, power agitators are typically placed in the reservoir from time to time to keep the manure from settling to a point such that a solid cake or layer of sludge is formed at the bottom. More modern pumps, such as that illustrated in U.S. Pat. No. 4,594,006 incorporate agitator apparatus in the form of augers and/or nozzle jet agitators which redirect a portion of the pumped slurry back into the reservoir to mix the sediment and liquid into a pumpable slurry.

Due to the "seasonal" emptying of the reservoir, and the need to be able to move a pump or agitator from location to location within the reservoir, such pumps and agitators used to empty and service the reservoir have typically been fairly portable. Further, it has been common to provide power to the pumps and agitators directly from a mechanical power take-off (PTO) or hydraulics of a tractor. One class of such pumps, such as illustrated in U.S. Pat. No. 4,661,046 requires the pump to be physically lifted, placed and secured in a proper pumping position relative to the reservoir. This type of pumping apparatus is suitable wherein a sleeve or other mounting structure is available for securing the pump in operative position relative to the reservoir. However, for large open pits or storage reservoirs, a larger pump having ease of mobility to and from the reservoir and for movement along the peripheral edges of the reservoir is preferred.

A number of portable pump and agitator structures generally configured for pulling behind and for positioning by a tractor are known in the art. Examples of such structures are shown, for example, in U.S. Pat. Nos. 3,905,725 and 4,594,006. Such structures are typically pivotally mounted to the axle assembly of the wheel structure used to transport the assembly such that the impeller head portion of the pump agitator is pivotally and/or telescopically lowered as an integral unit to its operative position within the reservoir. Often, however, such pump or agitator configurations are not "long" enough to be positioned far enough out into the reservoir to be effective or sufficiently efficient in emptying or agitating the reservoir contents. Further, in more shallow reservoirs, such pivotal apparatus which retains the support wheels at the upper edge of the reservoir, do not always provide that angular attitude for the pump which is operatively most efficient. There have been attempts such as illustrated in U.S. Pat. No. 5,100,303 to provide trailable pump and agitator assemblies wherein the support wheel structure for the apparatus is itself lowered into the reservoir. Such structures, however, are fairly complex and suffer the disadvantage of requiring submersion of the wheel assemblies into the corrosive material being pumped.

To the extent that the disclosures of the above referenced U.S. Pat. Nos. 3,687,311; 3,876,341; 3,905,725; 4,439,115; 4,594,006; 4,661,046 and 5,100,303 are required for providing a more complete description of the relevant art, they are hereby incorporated by reference.

While the above-described manure handling configurations provide in most cases adequate techniques for agitating and pumping the manure slurry from a reservoir, they are not always the most convenient or economical to use, and may require repeated time-consuming placement and movement maneuvers of the apparatus around the reservoir in order to effectively agitate and/or empty the reservoir. Since none of such agitator pump configurations known to date provide any degree of independent steerability, such movements of the assemblies require coordinated trailing maneuvering by the towing tractor, generally requiring the pump agitator to be physically removed from the reservoir and repositioned at a different location. Further, there are circumstances wherein there is limited access to the reservoir, or wherein it may be desireable to access the reservoir over an obstacle such as a fence, or wherein an above ground high-walled reservoir needs to be pumped and/or agitated. In such circumstances, the structures described above are generally unacceptable for performing the tasks.

While there are known pumping structures having flexible boom configurations suitable for pumping materials such as concrete and the like over obstacles or which use only vacuum pumping techniques, such pumps do not generally satisfy the other aforementioned desireable characteristics of pumps and agitators for forming and pumping of manure slurries from storage reservoirs. Most such known structures generally are expensive pumping configurations mounted on a truck bed or powered vehicle, and are simply not economically practical for use in a farming environment. The present invention addresses the aforementioned needs for an economical, efficient and easy to use apparatus for agitating and/or pumping slurry material from a storage reservoir in a manner that enables ease of maneuverability for readily placing the pump intake or agitation head at a desired position, that enables the pump or agitator to be directly powered from the tractor's auxiliary PTO and hydraulics, and that enables the pump or agitator to access the reservoir over physical obstacles such as fences or vertical reservoir walls. The present invention also provides a degree of improved reliability and economy by enabling cooling for the hydraulic power lines energizing the pump, by cooling such lines directly by the material being pumped.

SUMMARY OF THE INVENTION

The present invention comprises an improved pump and/or agitation apparatus of a type that is carried by a wheeled towed vehicle of a type that is particularly applicable for towing by a common tractor of the type used in farming and ranching-type operations. Such tractors generally already include a hydraulic system having one or more auxiliary hydraulic output lines and associated controls therefor that can readily be used to power such external hydraulic components as hydraulic cylinders. Such tractors also typically include a mechanical power take-off (PTO) which can be used to drive an auxiliary hydraulically operated pump. The present invention takes advantage of the existence of such PTO and hydraulic power capabilities of such tractors, by providing a pump/agitator apparatus that is not only readily towed and maneuverable by such tractors, but which also has all of its powerable functions capable of being entirely powered by the tractor's hydraulics and PTO sources. Such hydraulics and PTO sources are utilized to energize the unique lifting capabilities of the invention, its unique conduit bending capabilities, its unique steering capabilities and the actual pumping and/or agitation functions of the system.

According to one aspect of the invention, there is provided a trailable hydraulic beam apparatus for processing manure slurries which includes a wheeled transport frame suitable for towing by a tractor over a support surface, an elongated conduit beam mounted to the transport frame which extends between first and second ends and which is generally rigid except for an elongate flexible section near its center, and flex control means for bending the conduit at its flexible section to control the vertical orientation of the non-towed end of the conduit beam. The conduit beam generally defines a fluid passageway extending from the distal moveable end, to which a pump and/or agitator is connected. The apparatus includes lift means for controllably lifting the flexible portion of the conduit relative to the support surface. Such lift means is preferably hydraulically operable. The invention also includes hydraulically operable means for controllably steering the wheels of the assembly to enable ease of maneuverability of the assembly, despite its relatively long length. The invention also includes means for cooling hydraulic fluid used by the hydraulic pump or agitator, by using the cooled temperature of the slurry being pumped to draw heat from the hydraulic fluid.

According to a further aspect of the invention, there is provided a flexible hydraulic pump apparatus having first, second and third operatively connected and aligned conduit segments wherein the central conduit segment is flexible, a linkage means connecting the first three segments in a manner such that the second and third segments can be carried by the first segment in cantilevered manner, and flexure means operatively connected to the linkage means for moving the linkage means to bend the flexible section and lower the distally positioned segment in controlled manner so as to position a pump or agitator located at the end of the distal segment within a storage reservoir for the material to be pumped. Such apparatus includes means for lifting the interconnected conduit assembly in a manner such that said conduits can be inclined upwardly from the towing vehicle hitch assembly to project over fences, obstacles or the like, and such that the distal conduit segment can then be lowered in operative position on the other side of the fence or obstacle, to effect the pumping and/or agitation operation.

According to yet another aspect of the invention, there is provided in combination with a towed hydraulic pumping apparatus of the type having a hydraulic pump operatively connected to one end of an elongate conduit through which a slurry material is pumped, an apparatus for lifting and operatively positioning the hydraulic pump relative to the slurry material, comprising: means operatively connected with the elongate conduit for hydraulically lifting the conduit and attached pump in cantilevered manner over a raised obstacle; and flexure means for controllably bending the conduit to lower the pump into a pumping position while maintaining at least a portion of the elongate conduit in overlying relation to the obstacle.

According to yet another aspect of the invention, there is provided a method of positioning a towed hydraulic pump assembly in pumping position relative to a slurry material to be pumped, comprising the steps of: positioning the pump assembly in proximity to the slurry material to be pumped; extending a hydraulic pump at the end of an elongate conduit in cantilevered manner over the material to be pumped; and controllably bending the conduit material intermediate its ends to lower the pump into the material to be pumped. The invention provides for controlled bending of the conduit material through an angular range of from zero to ninety degrees.

While the present invention will be described with respect to a particular configuration of conduit segments and interconnections thereof, it will be understood by those skilled in the art that the invention is not to be limited by the details of such description. Further, while the present invention will be described with respect to a particular linkage configuration interconnecting the rigid conduit portions and providing for controlled vending of the flexible conduit portion, it will be understood that many different configurations of such feature can be used within the spirit and intent of this invention. Further, while a particular wheel and axle lifting assembly are disclosed for inclining the conduit assembly for maneuvering and positioning over obstacles and the like, it will be readily appreciated that a number of other lifting configurations can be designed which fall within the scope of this invention. Further, while a particular configuration of hydraulic pump and agitators are illustrated in the preferred embodiment, it will be appreciated that the principals of the invention apply to any type of known hydraulically activated pump or agitator assembly. Similarly, while the cooling and steering features describe particular configurations that are particularly applicable to the preferred embodiments of the invention described herein, it will be understood that the invention is not to be limited by the specifics of the described embodiments thereof, but that all alternative implementations thereof apply. These and other variations of the invention will become apparent to those skills in the art upon a more detailed description of the invention.

BRIEF DESCRIPTION OF THE DRAWING

FIG. 3 is an enlarged sectional view of the hydraulic cooling portion of the pump of FIG. 1;

FIG. 4 is a cross-sectional view of the hydraulic cooling portion of FIG. 3, generally taken along the Line 4—4 of FIG. 3;

FIG. 5 is a top plan view of the axle assembly portion of the pump of FIG. 1, generally viewed along the Line 5—5 of FIG. 1;

FIG. 6 is an enlarged view of the linkage assembly connecting and controlling bending of the flexible conduit portion of the pump of FIGS. 1 and 2 illustrated as it would appear when the trailing end portion of the pump assembly is positioned in the lowered phantom positions of FIGS. 1 and 2;

FIG. 9 is a top plan view of the steerable axle assembly of FIG. 7;

FIG. 10 is a partial diagrammatic view of the trailing end of the pump apparatus of FIGS. 1 and 2 illustrating use of a pump head assembly incorporating jet nozzle agitation;

FIG. 11 is a partial view of the trailing end of the pump apparatus of FIGS. 1 and 2 illustrating optional replacement of the pump head assembly of FIGS. 1 and 2 with a prop-type agitator head assembly.

DESCRIPTION OF THE PREFERRED EMBODIMENTS

From the following description, it will be appreciated that the principles of this invention apply to the positioning and use of both slurry pumps and/or agitators. While the preferred embodiment first described will be directed toward application of the invention to a pumping apparatus, it will be appreciated by those skilled in the art that the same or similar description applies to slurry agitation as well. Further, while the principles of the invention will be described with reference to the preferred embodiment of handling manure slurries, it will be readily appreciated that the basic principles of the invention apply to the handling of slurries in general.

Figure 1:
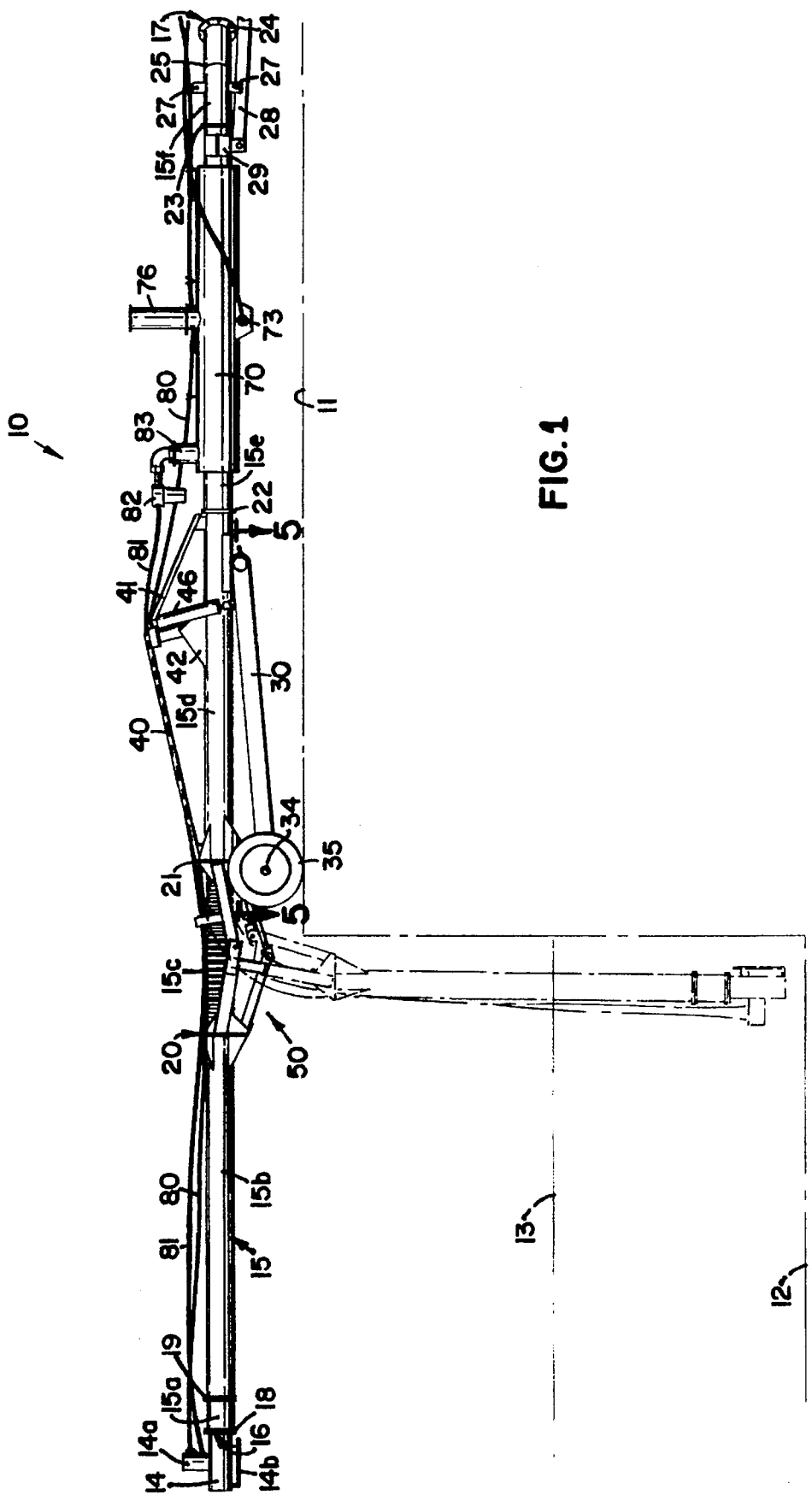
FIG. 1 is a side elevational view with portions thereof broken away of the pump apparatus of the present invention, illustrated in a horizontal trailing position, and illustrating in phantom the pump portion thereof in an operative lowered position.

Referring to the Figures, wherein like numerals represent like parts throughout the several views, a first embodiment of a pumping apparatus configured according to the principles of this invention is generally illustrated at 10 in FIG. 1. The pumping apparatus 10 is illustrated in solid lines as it would appear when positioned for transport or resting upon a support surface 11. The downwardly extending phantom lines of FIG. 1 illustrate the pumping apparatus 10 as it would appear when operatively positioned so as to extend the trailing portion of the pump apparatus in a generally vertical position, as it might appear when extending into an in ground pit or a reservoir, generally designated at 12. A typical upper level of slurry material to be agitated or pumped from the reservoir 12 is generally illustrated at 13.

Pumping apparatus 10 generally includes a plurality of conduit members (generally designated at 15) operatively longitudinally connected together to form a fluid passage from an inlet end 16 to which a hydraulic pump 14 is connected and an outlet end 17 through which pumped fluid is discharged or further directed to an appropriate receptor such as a conduit or a hose to a mobile tanker or the like. In the preferred embodiment, the conduit 15 has a plurality of segments longitudinally connected to one another at cooperatively aligned ends to form an unobstructed fluid path through the interior of the conduit from the inlet end 16 to the outlet or discharge end 17. A first conduit segment 15a extends between a cooperative pair of flanges 18 at the inlet port 16 to a second flange pair 19. The terminology "flange pair" is intended to refer to a pair of cooperatively mating flanges of longitudinally aligned components such as conduit segments, such that when cooperatively aligned with and secured to one another operatively connect the aligned components to one another in sealed or otherwise operative manner. For example, the annular flange or collar portion of the flange pair 18 that forms part of the first conduit segment 15a is sealingly secured to a mating flange collar portion of the flange pair 18 of the hydraulic pump 14, to operatively connect the hydraulic pump 14 in fluid communication with the first conduit segment 15a. The first conduit segment 15a represents, in the preferred embodiment, a replaceable "extension" segment of the conduit 15 which can be replaced by segments of varied length. For example, if additional length (as hereinafter described in more detail) is required to place the hydraulic pump 14 further into a reservoir or at a lower position within the reservoir 12, an appropriate longer conduit segment 15a would be used. Further, it will be appreciated that the first conduit section 15a, besides being adaptable to provide extended lengths of conduit, could be replaced by a bent or angled conduit section for varying the direction or operative attitude of the pump or implement carried by the conduit 15a.

The forward flange collar 19 (flange pair 19) of the first conduit segment 15a cooperatively mates with and is sealably secured to a rearward flange (flange pair 19) of a second conduit segment 15b. The forwardly directed end of the second conduit segment 15b defines an annular hose seat (not illustrated), but generally designated at 20, for cooperatively receiving in overlying engagement therewith a third conduit segment 15c. The annular hose seat 20 is identical in construction to hose seat 21 described below and illustrated in FIGS. 7 and 8.

The third conduit segment 15c is, in the preferred embodiment, a semi-rigid, but flexible cylindrical hose member that can be bent along its longitudinal axis to form a flexible conduit between its opposite ends, while retaining its cylindrical shape for pressurized pumping of a slurry therethrough. The trailing portion of the hose conduit segment 15c overlies and matingly engages the annular hose seat 20 of the second conduit segment 15b and is appropriately clamped thereto to form a sealed connection therewith. The forwardly directed end of the hose conduit segment 15c is similarly operatively configured for mating engagement and sealable connection to a rearwardly extending annular hose seat 21 (See FIGS. 7 and 8) of a fourth conduit segment 15d. The hose seat connections 20 and 21 also each include mounting flanges forming one half of a flange pair for mechanical connection to cooperating flange pair portions of a mechanical linkage assembly 50, hereinafter described in more detail.

The fourth conduit segment 15d extends between the annular hose seat connection 21 at is rearward end to a first portion of a flange pair or collar, generally designated at 22, at its forwardly directed end. The second mating portion of the flange pair collar 22 forms the rearwardly directed end of a fifth conduit segment 15e, which terminates at its forwardly directed end at a first portion of another collar flange pair, generally designated at 23. The flange pair 22 operatively connects the fourth and fifth conduit segments 15d and 15e. The second mating portion of the collar flange pair 23 forms the rearward end of a sixth conduit segment 15f which is operatively sealingly connected by means of the collar 23 to the fifth conduit segment 15e. The forward end of the sixth conduit segment 15f terminates at a flange collar 24 at the outlet port 17 of conduit 15. Collar 24 is appropriately configured for connection to an appropriate discharge conduit extension such as a hose or pipe member for carrying material pumped through conduit 15 to an appropriate receptacle such as a portable tanker or other storage container well-known in the art. Alternatively, the pumped discharge could be partially or wholly redirected or directal to a jet-type agitator apparatus, either connected to the conduit or pump assembly, or to a remotely positioned agitator assembly.

It will be understood that while a particular configuration of the conduit 15, comprising a plurality of conduit segments 15a–15f has been illustrated in the preferred embodiment of the invention described, that the invention is not to be limited to such segmented configuration, and that such configuration has been illustrated simply to depict one example of a working embodiment of a pumping apparatus 10, which otherwise incorporates the principles of this invention. Further, no limitations are to be implied or intended by the use of collar or flange pair, or hose seat connections such as those illustrated at 19–24 of the described embodiment. It will be readily appreciated by those skilled in the art that the value and function of such connections is to provide a continuous fluid flow path through the conduit 15 from the inlet port 16 to the outlet port 17 and/or to otherwise provide a continuous mechanical operative connection extending from the inlet end 16 to the outlet end 17 of the apparatus thereof.

In a preferred embodiment, conduit segments 15a, 15b, 15d, 15e, and 15f are configured of steel tubing material having an 8 inch inside diameter. Also in the preferred embodiment, the forwardmost portion of the sixth conduit segment 15f is bent at an angle (generally designated at 25 in FIG. 1) to the longitudinal axis of the fifth conduit segments 15e, to direct the discharged fluid flow from the conduit slightly to the left or right of the conduit 15. As illustrated in FIG. 1, the sixth conduit segment is positioned so as to direct pumped material to the "right" of the pumping apparatus as viewed from the outlet end (or tractor end) of the pumping apparatus. A pair of channel brackets 27 are welded to and extend in opposed vertical radial directions from the outer surface of the outlet conduit 15f. The extending tab portions of each of the channel brackets 27 have aligned holes formed therethrough for accepting a pin member, as described in more detail hereinafter. The opposed channel brackets 27 are aligned on the outlet conduit 15f such that the lowermost bracket is operatively aligned with a towing hitch member when the outlet conduit segment 15f is positioned as illustrated in FIG. 1, to direct the slurry flow either to the right or to the left of the pumping apparatus. If the conduit 15f is rotated 180 degrees from the position illustrated in FIG. 1, that bracket 27 that was formerly on top of the conduit 15f will now be positioned on the bottom of the conduit, to cooperatively address the towing hitch member 28.

A tractor hitch arm 28 is pivotally secured by means of a collar assembly 29 to the fifth conduit segment 15e. The tractor hitch arm 28 is generally of U-shaped channel iron configuration, and has a pair of holes formed therethrough and positioned for cooperative alignment with the holes of the channel brackets 27 when positioned as illustrated in FIG. 1 or is rotated 180 degrees from the FIG. 1 position, to accept a locking pin member therethrough, which secures the outlet conduit segment 15f to the tractor hitch arm 28, for stabilizing the outlet conduit segment 15f. The forward end of the tractor hitch arm 28 (not illustrated) is connected to a pivot hitch member for securement to the hitch assembly of a tractor (not illustrated) such that the tractor hitch arm 28 can pivotally move in a vertical direction about the tractor hitch, while the hitch connected end of Arm 28 is constrained by the tractor hitch. The tractor hitch arm 28 enables the pump assembly 10 to be operatively connected in trailing fashion to the tractor for transport or maneuvering operations.

The pump assembly 10 is supportively carried and transported over the support surface 11 by means of a wheel and axle assembly. The wheel and axle assembly (FIG. 5) generally includes a box-like support frame 30 having a pair of elongate outer support stringers 30a and 30b interconnected by means of intermediate transverse brace members 30c and 30d. The intermediate transverse support brace 30d has a pair of tab members 37 welded thereto and upwardly extending therefrom for cooperatively pivotally securing the piston end of a hydraulic cylinder, as is hereinafter described in more detail. The foremost ends of the longitudinal stringers 30a and 30b are welded to a cylindrical pipe brace 30e. The pipe 30e forms the rotatable pin portion of a hinge assembly which is completed by a hexagonally shaped saddle clamp pair, generally illustrated at 31. The upper member of the saddle clamp pair 31 is welded to the lower portion of the fourth conduit segment 15d. The lower members of the saddle clamp pair 31 cooperatively engages and supports the cylindrical brace 30e between the saddle clamp pair 31 for rotational movement about the central axis of the pipe member 30e. Each of the longitudinal stringer supports 30a and 30b is connected at its trailing end to an outwardly projecting stub axle (generally indicated at 34) which projects generally perpendicularly outward from the general plane of the longitudinal stringer member, and cooperatively supports a wheel and tire member, generally indicated at 35. In the embodiment illustrated in FIG. 1, the wheel and axle assembly is simply one configured for trailable motion of the pump assembly relative to a towing tractor, and is not steerable. A steerable embodiment of the invention is illustrated later with reference to a second embodiment thereof.

Figure 7:
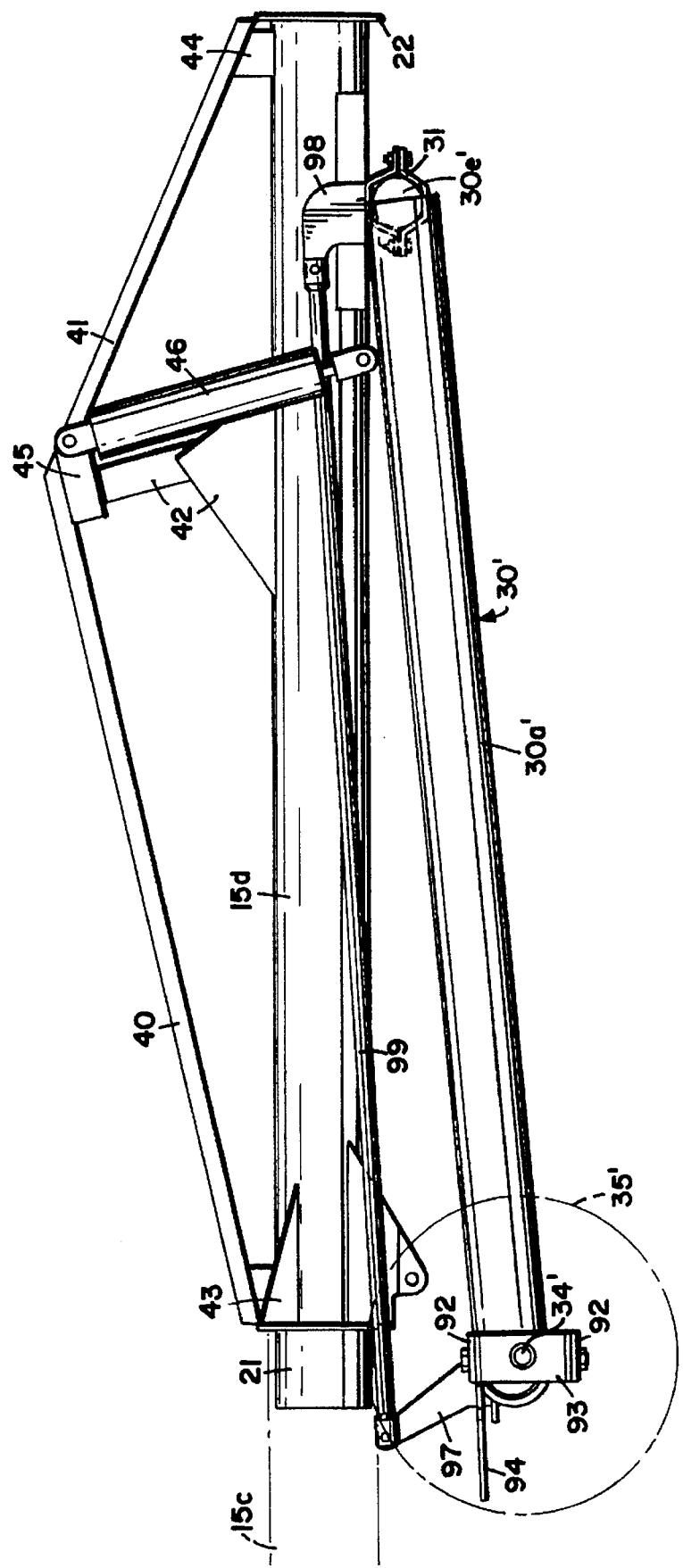
FIG. 7 is a side elevational view of a second embodiment of the axle assembly portion of the pump of FIG. 1, illustrating a steerable axle assembly.
Figure 8:
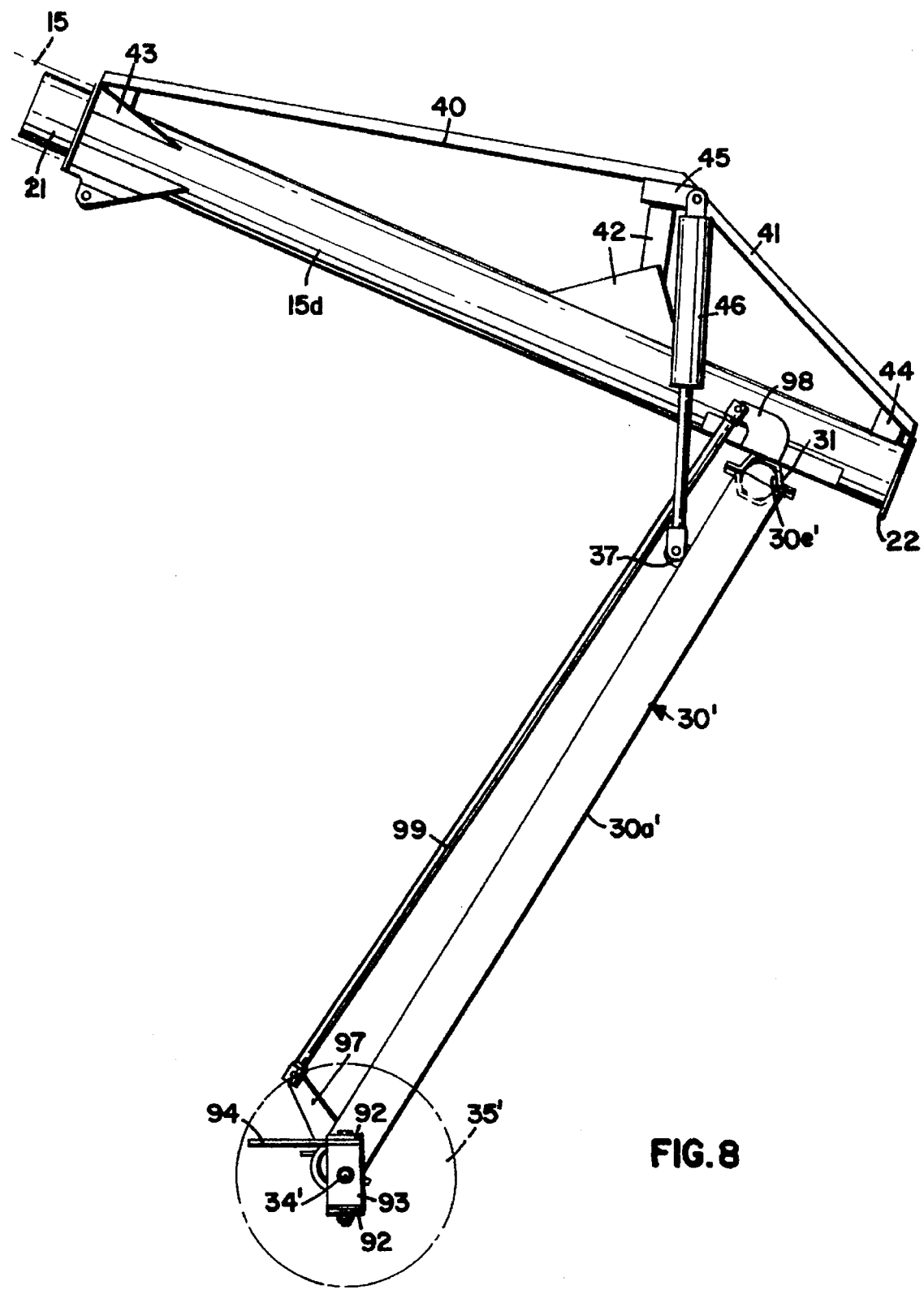
FIG. 8 is a side elevational view of the steerable axle assembly of FIG. 7, as it would appear when the axle assembly lifts the pump conduit body.

A triangular upper truss assembly is welded to the upper surfaces of the fourth conduit segment 15d (See FIGS. 7 and 8). The truss assembly includes a pair of elongate channel iron upper brace members 40 and 41 joined at one end and welded to an upright support arm assembly 42 which is welded to the outer upper surface of the fourth conduit segment 15d, generally centrally thereof. The distal ends of the upper brace members 40 and 41 are respectively welded to the upper outer surface of the fourth conduit segment 15d by support bracing 43 and 44 respectively, located generally at the opposite extremities of the fourth conduit segment 15d. The support bracing 43 is secured to and strengthens the flange 21 that connects to the mechanical linkage assembly 50 described below. A cross-support arm, generally indicated at 45, is fixedly secured by welding to the upper end of the upright support arm assembly 42 such that the distal portions of its arm members extend outwardly to either side of the support assembly 42 and generally perpendicular to the general plane defined by the truss members and the central axis of the conduit segment 15d. The outwardly extending arm portions of support member 45 are configured to pivotally mount the cylinder portions of a pair of hydraulic lift cylinders 46. The piston members of the hydraulic cylinders 46 are pivotally secured to the upright tab members 37 of the wheel and axle assembly. In the preferred embodiment, the lift cylinders are dual action hydraulic cylinders having dimensions of 2.5 inches in diameter and 16 inches long. As pivotally connected between the upper support arm 45 and the tab members 37 of the wheel and axle support frame 30, the pair of hydraulic cylinders 46 function to pivotally rotate the wheel and axle support frame 30 about the axis of its upper pipe hinge member 30e, thereby raising and lowering the pump assembly as hereinafter described in more detail. The U-shaped channel configuration of the upper brace members 40 and 41 serve to retainably hold and carry a pair of hydraulic lines (described below) for energizing the hydraulic motor 14.

While the flexible conduit segment 15c operatively connects the second and fourth conduit segments 15b and 15d in fluid communication, it provides little structural support for interconnecting the two segments. Mechanical support for the flexible conduit section 15c and the physical support interconnection between the second and fourth conduit sections 15b and 15d is provided by means of a linkage assembly, generally indicated at 50. An enlarged view of the linkage/support assembly 50 is illustrated in FIG. 6. The linkage assembly 50 includes a pair of identical linkage structures mounted one each on each side of the flexible conduit 15c, to enable unobstructed flexing in a vertical plane of the conduit 15c. Since the linkage assemblies on either side of the flexible conduit 15c are identical, only one will be described herein. Each such linkage assembly includes a pair of linkage arms 50a and 50b pivotally connected to one another at one end thereof, and fixedly secured at their other ends which are in turn welded to respectively to brace members 51 and 52 respectively to the halves of flange pairs 20 and 21 respectively. The flange pairs 20 and 21 when operatively connected to their respective mates, and the linkage assembly 50 mechanically interconnect the ends of the second and fourth conduit segments 15b and 15d. The pair of linkage arms 50a on either side of the flexible conduit segment 15c are connected for common movement by means of a wishbone yoke bracket 54 extending transversely below the flexible conduit 15c and at a position so as not to engage and interfere with the flexible movement of conduit 15c as it bends. A single centrally located lower support 55 is welded at one end to the bracing 51 and associated flanges 20 so as to be centrally aligned with the lower surface of the second conduit segment 15b. The forwardly projecting end portion of the lower support 55 is fixedly secured to the wishbone yoke bracket 54 and has an end configured to pivotally secure the piston portion of a hydraulic flex cylinder 60. The body or cylinder portion of the hydraulic flex cylinder 60 is pivotally mounted to the support bracing for the flange 21 portion of the fourth conduit segment 15d and is centrally aligned along the lower surface thereof. In the preferred embodiment the flex cylinder 60 is of the same construction as the lift cylinders 46. A pair of upwardly extending guide members 56 are connected to and vertically extend upward from the pair of linkage arms 50b for retainably confining the flexible conduit 15c therebetween as the conduit 15c is flexed by means of the hydraulic flex cylinder 60 and mechanical linkage assembly 50.

The mechanical linkage assembly 50 above-described, in combination with the hydraulic flex cylinder 60 cooperatively pivotally move the first and second conduit portions 15a and 15b and their connected hydraulic pump 14 about the pivotal axis 61 defined by the pivotal interconnections of the four linkage arms 50a and 50b—all under control of the hydraulic flex cylinder 60. As the hydraulic cylinder 60 is activated to extend its piston arm "outwardly" from the body of the hydraulic cylinder, the conduit portions 15a and 15b will pivotally move in a clockwise direction about the pivot axis 61. Conversely, as the hydraulic cylinder 60 is activated to "retract" its piston arm into its housing body, the conduit segments 15a and 15b will be pivotally moved in a counterclockwise direction about the axis 61 to "lower" the inlet 16 and pump 14 relative to the longitudinal axis of the interconnected fourth and fifth conduit segments 15d and 15e, as is illustrated in phantom lines in FIGS. 1 and 2.

As illustrated in the figures, the hydraulic pump 14 is in the preferred embodiment transversely mounted relative to the longitudinal axis of the first and second conduit segments 15a and 15b such that the housing of its motor portion 14a extends generally perpendicularly to the axial direction of the conduits 15a and 15b, and such that the intake or inlet for drawing slurry into the conduit 15 is located along the lower lateral portion of the pump head assembly, as illustrated at 14b. As will be appreciated by those skilled in the art, the orientation of the pump 14 relative to the conduit 15 can be selectively changed by rotating the pump assembly 14 by means of its associated flange pair 18. Also, as will be appreciated by those skilled in the art, the pump head assembly 14 could be removed altogether from the assembly and replaced by means of a hydraulically powered impeller or prop-type assembly 14 (as illustrated in FIG. 11), if the apparatus were only to be used for agitation purposes. The assembly could also be adapted, as will be appreciated by those skilled in the art and as illustrated in FIG. 10, to provide a pump assembly having a portion of the pumped material diverted by a bypass line 9 to a nozzle assembly 8 or the like positioned partially up along the first or second conduit portions, to act as a "jet" agitator for facilitating formation of a pumpable slurry from the sediment and liquids of a reservoir. These and other modifications to the described structure will be apparent to those skilled in the art.

The pump 14 in the preferred embodiment is a standard hydraulic pump configured for operation by a PTO driven hydraulic pump 104 (FIG. 12) to which the pump assembly is operatively connected. In a preferred embodiment of the invention, return hydraulic fluid from the pump 14 is cooled by a cooling reservoir generally indicated at 70. The cooling reservoir 70 longitudinally extends along a significant length of and encircles the fifth conduit segment 15e (FIGS. 1, 3 and 4). In the preferred embodiment, the cooling reservoir 70 comprises a cylindrical steel shell member of approximately 12 inches diameter, which surrounds the 8 inch diameter steel conduit 15e. Annular end caps 70a and 70b are welded at either end of the cooling reservoir 70 and between the outer shell thereof and the outer surface of the conduit 15e to provide an enclosed sealed tubular cavity 71 between the outer surface of conduit 15e and the outer shell portion of the cooling reservoir 70. A first input port for hydraulic fluid flow into the inner cavity 71 of the cooling reservoir 70 is provided at 72, and an outlet port for fluid flow out of the cooling reservoir cavity 71 is provided at 73 (see FIG. 3).

Referring to FIGS. 3 and 4, a pair of longitudinally extending baffle plates 74 are welded between the outer surface of the conduit member 15e, along diametrically opposing sides thereof, and the inner surface of the outer cooling reservoir jacket 70. The baffle plates 74 extend from and engage the end plate 70a adjacent the inlet port 72 and longitudinally extend along the length of the cooling reservoir 70 to a position adjacent to but spaced from the second end plate 70b. The baffle plates 74 divide the inner cavity 71 into upper and lower manifolds and cause hydraulic fluid entering the inlet port to first flow in the upper manifold along the upper surface of the conduit 15e in the direction from the forward end plate 70a to the rearward end plate 70b. At the rearward end plate 70b, the oil will pass down along the ends of the baffle plates 74 into the lower manifold and will proceed along the lower surfaces of the baffle plates and engage the lower surface of the conduit 15e, until it exits out of the outlet port 73. As the hydraulic fluid progresses along such serpentine path, it comes into contact and is cooled by the outer circumferential area of the conduit 15e through which cooled slurry is being pumped. Accordingly, the hydraulic fluid is cooled by the pumped material.

A second inlet port, generally indicated at 75, is provided into the internal cavity 71 of the cooling reservoir 70, to which is connected a hydraulic filler and vent cap assembly, generally indicated at 76. A plurality of hose guide members 78 are also secured to the outer surface of the cooling reservoir 70. The input or energizing hydraulic line 80 for the hydraulic pump 14 extends from the PTO driven pump and is retainably held by the hose guide members 78. The hydraulic input line extends backward along the conduit 15 and is entrained and guided by the channel bracket members 41 and 40, past the flexible conduit portion 15c and along the second and first conduit sections 15b and 15a respectively, to the inlet port of the hydraulic pump motor 14. The return line from the hydraulic pump 14, generally indicated at 81, follows a parallel path with the inlet line 80 back to the cooling reservoir 70 where it is connected to direct the return hydraulic fluid through a filter 82 and a diffuser element 83, which is operatively connected at the first inlet port 72 of the cooling reservoir 70. The return hydraulic fluid then passes through the cooling reservoir 70 as above described, and exits through the outlet port 73 to resume its path by means of the return line 81 to the PTO driven pump.

A second embodiment of a wheel and axle assembly for the pump assembly is illustrated in FIGS. 7–9. The second wheel and axle assembly embodiment enables controlled steering of the pump agitator assembly which provides improved maneuverability of the pump assembly and would enable, for example, the pump assembly to be moved laterally along a sloped embankment of a reservoir when pulled by a tractor, without requiring the pump assembly to be removed from the reservoir. The steering assembly also enables ease of maneuverability of the apparatus around buildings or in tight quarters and through door openings or access ports to reservoirs.

Referring to FIGS. 7–9, those portions of the wheel and axle assembly which are common to the wheel and axle assembly of the previously described first embodiment, are illustrated by the same numeral designation as previously used, but with a prime (') designation. In general, the box-like support frame 30' and its connection to the conduit section 15d and the hydraulic lift cylinders 46 are the same as previously described. The simple stud axle structure 34 of the first embodiment, however, has been replaced by a steering assembly described below.

The lowermost ends of the longitudinal axle assembly stringers 30a' and 30b' terminate in a pair of collar sleeves 90. The inner surfaces of the collar sleeves 90 slideably engage for rotational movement relative thereto, the outer surface of a tubular axle bar member 91. The outer ends of the axle bar 91 have a pair of U-shaped support brackets 92 secured thereto and projecting outwardly therefrom for rotational movement with the tubular axle bar member 91. The upper and lower flange portions of the U-shaped support brackets 92 have vertically aligned holes therethrough which are used to pivotally mount individual wheel axle assemblies 93. Each of the wheel axle assemblies 93 includes a stub axle member 34' suitable for rotatably mounting a wheel and tire 35'. The wheel axle assemblies 93 are mounted so as to pivot about the vertical axes defined by the mounting pins or bolts passing through the aligned holes in the U-shaped support brackets 92. The individual wheel axle assemblies 93 each has a generally horizontally extending lever-arm flange 94, the distal end of which is pivotally connected to opposite ends of a tie rod 95. A hydraulic steering cylinder 96 is operatively connected between the tie rod 95 and the tubular axle bar member 91 for cooperatively pivoting the individual wheel axle assemblies 93 through their extension lever arm flanges 94 in response to energization of the hydraulic steering cylinder 96.

The rotational attitude of the tubular axle bar member 91 about its axis 91a is controlled by means of a linkage assembly, so as to ensure that the vertical orientation of the U-shaped support brackets 92, and thus the individual wheel axis assemblies 93, remains constant regardless of the lift position of the axle frame assembly 30' as controlled by the hydraulic lift cylinders 46. In the preferred embodiment, the linkage assembly comprises a first bracket arm 97 welded to the outer surface of the tubular axle bar member 91 for movement therewith, a second bracket arm 98 welded to the fixed axle saddle member 31, and a linkage bar 99 extending therebetween and pivotally connected to the extended or distal ends of the first and second bracket arms 97 and 98. As the support frame 30 pivotally moves about the axis of its upper support 30e, the linkage bar 99 proportionately rotates the tubular axle bar member 91 through the bracket 97 to maintain a uniform rotational attitude of the individual wheel axle assembly members 93, as illustrated in FIGS. 7 and 8.

Figure 12:
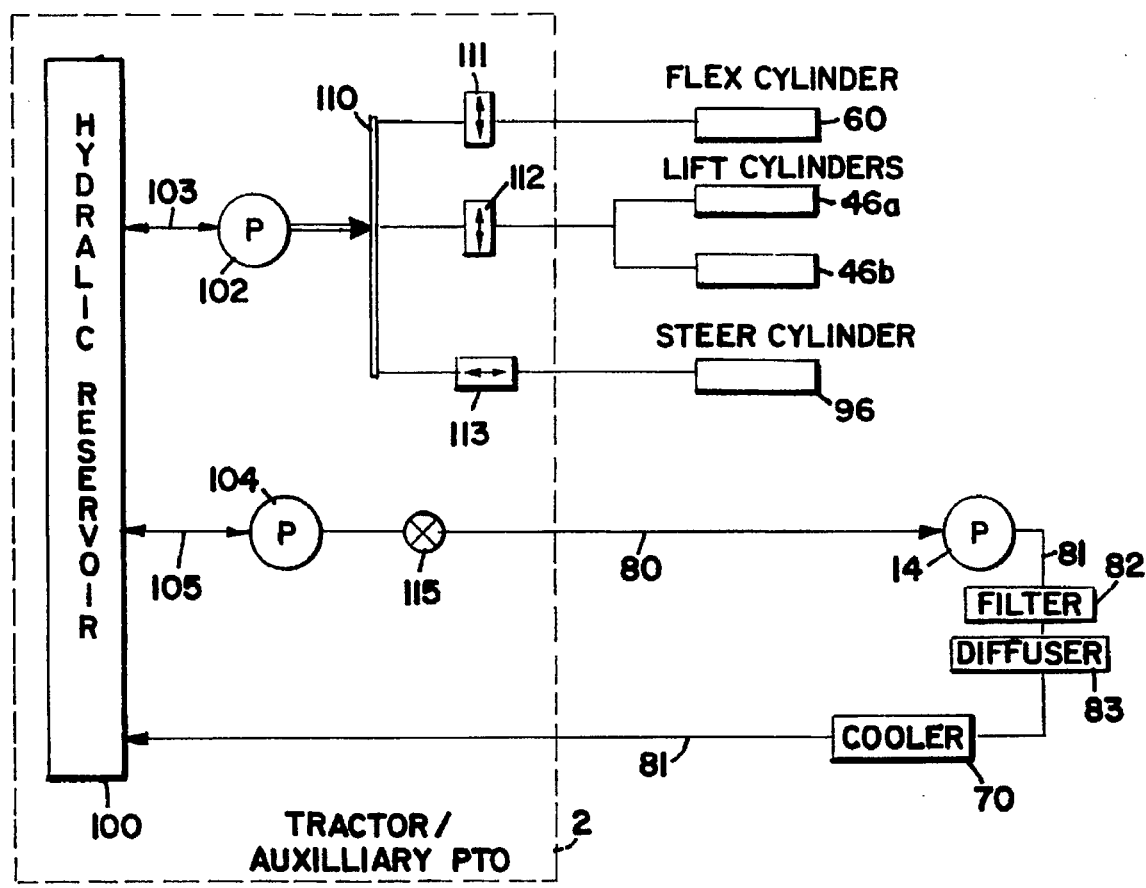
FIG. 12 is a hydraulic schematic diagram of the hydraulic portions of the pump of FIG. 1.

A simplified schematic block diagram representation of a hydraulic network for operating the various hydraulic cylinders previously described with respect to the preferred embodiments of the invention, is illustrated in FIG. 12. As previously described, the hydraulic components forming the pump/agitator apparatus assembly 10 of this invention are configured to be energized or powered by the hydraulics and power take-off (PTO) of the tractor to which the pump/agitator assembly in connected. Most tractors have hydraulics and a PTO source that would be suitable for use by the pump/agitator apparatus of this invention. However, it will be understood by those skilled in the art, that if additional hydraulic drive capacity were desired or needed, as for example in order to increase pumping volume of the hydraulic pump 14, auxiliary hydraulic supplies, well known in the art, could be employed.

Referring to FIG. 12, those portions of the tractor hydraulics commonly available in the field are generally indicated within the dashed block 2. Such available hydraulics generally include a hydraulic reservoir 100 and one or more hydraulic pumps. In the diagram illustrated in FIG. 12, one such hydraulic pump 102 is designated, and is available for pumping hydraulic fluid at differing pressure levels. In the preferred embodiment, the pump 102 which would be used for energizing the various hydraulic cylinders of the system typically would provide a hydraulic output of pressure of approximately 1500 to 2000 psi. The pump 102 is appropriately connected with the hydraulic reservoir 100 by hydraulic flow lines, schematically illustrated at 103. The output from pump 102 is illustrated as being provided to a hydraulic bus 110. Such hydraulic bus lines as 110 are generally subdivided into a plurality of output lines, each having associated therewith a switching member for controlling flow of the hydraulic fluid in multiple directions to externally connected hydraulic members such as hydraulic cylinders. In the block diagram illustrated in FIG. 12, there are three such output lines illustrated. A first such line is connected by means of a first hydraulic switch 111 and its associated auxiliary hydraulic line to the flex cylinder 60 for extending and retracting the cylinder piston in response to activation of the switching member 111. A second output line from the hydraulic bus 110 is connected by means of a dual switch element 112 and its associated hydraulic line to energize the lift cylinders 46a and 46b for raising and lowering the wheel and axle assembly. The lift cylinders 46a and 46b are operated in parallel in response to activation of the control member 112. The hydraulic bus 110 is further connected to a third output of the hydraulics 2 by means of a third control unit 113 and its associated hydraulic output line to the steering cylinder 96, for steering the wheel assemblies by moving the tie rod 95. For simplicity, the hydraulic lines leading to the various hydraulic cylinders have not been shown in the mechanical figures, but are understood to be present.

A higher pressure pump 104 is included which is driven by the mechanical PTO of the tractor. Pump 104 preferably has a higher output pressure than pump 102, typically in the 3000 psi range. Such a pump, capable of moving 20 gallons per minute of hydraulic fluid, would have a pumping capacity with the preferred embodiment configuration of approximately 1200 gallons/minute. Pump 104 is connected to reservoir 116 by means of line 105 and is connected to the input port of the hydraulic pump 14 by means of a hydraulic switch control, generally designated at 115, and hydraulic input line 80. The output port of the pump 14 is connected by means of the hydraulic return line 81 and the filter 82, diffuser 83 and cooling assembly 70 back to the hydraulic reservoir 115. Generally, the return pressure in the return hydraulic line is significantly reduced to approximately the 200–300 psi range.

From the foregoing, those skilled in the art will readily appreciate the simplicity of operation of the pump/agitator assembly 10 of this invention, and the multiple application uses to which such apparatus can be put. For transport purposes, the conduit 15 portions of the assembly are generally longitudinally aligned along a common axis as illustrated in solid lines in FIG. 1. This occurs when the lift cylinders 46 are energized to maintain the wheel and axle assembly in a "lowered" position and when the flex cylinder 60 and the associated linkage assembly 50 are cooperatively energized so as to position the flexible conduit section 15c in a "straight" position. In a preferred embodiment of the invention, the overall length of the pump/agitator apparatus 10 extends approximately 40–45 feet. For a preferred embodiment construction of the pump/agitator assembly, the first and second conduit sections 15a and 15b extend approximately 12 feet, the third flexible conduit section 15c, when extended in a straight configuration as illustrated in FIG. 1, extends approximately 6 feet, the forth conduit section 15d extends approximately 10 feet, and the fifth conduit section 15e extends between 12 and 14 feet. With such configuration, it is possible to position the pump/agitator apparatus adjacent a vertical wall of an in-ground pit or reservoir (as illustrated in phantom lines of FIG. 1), to enable pumping of such a reservoir down to about 12 feet. Obviously, extension conduits could be applied in place of the relatively short first conduit section 15a in order to increase or extend the length of that conduit portion extending beyond the flexible tubing portion 15c.

Figure 2:
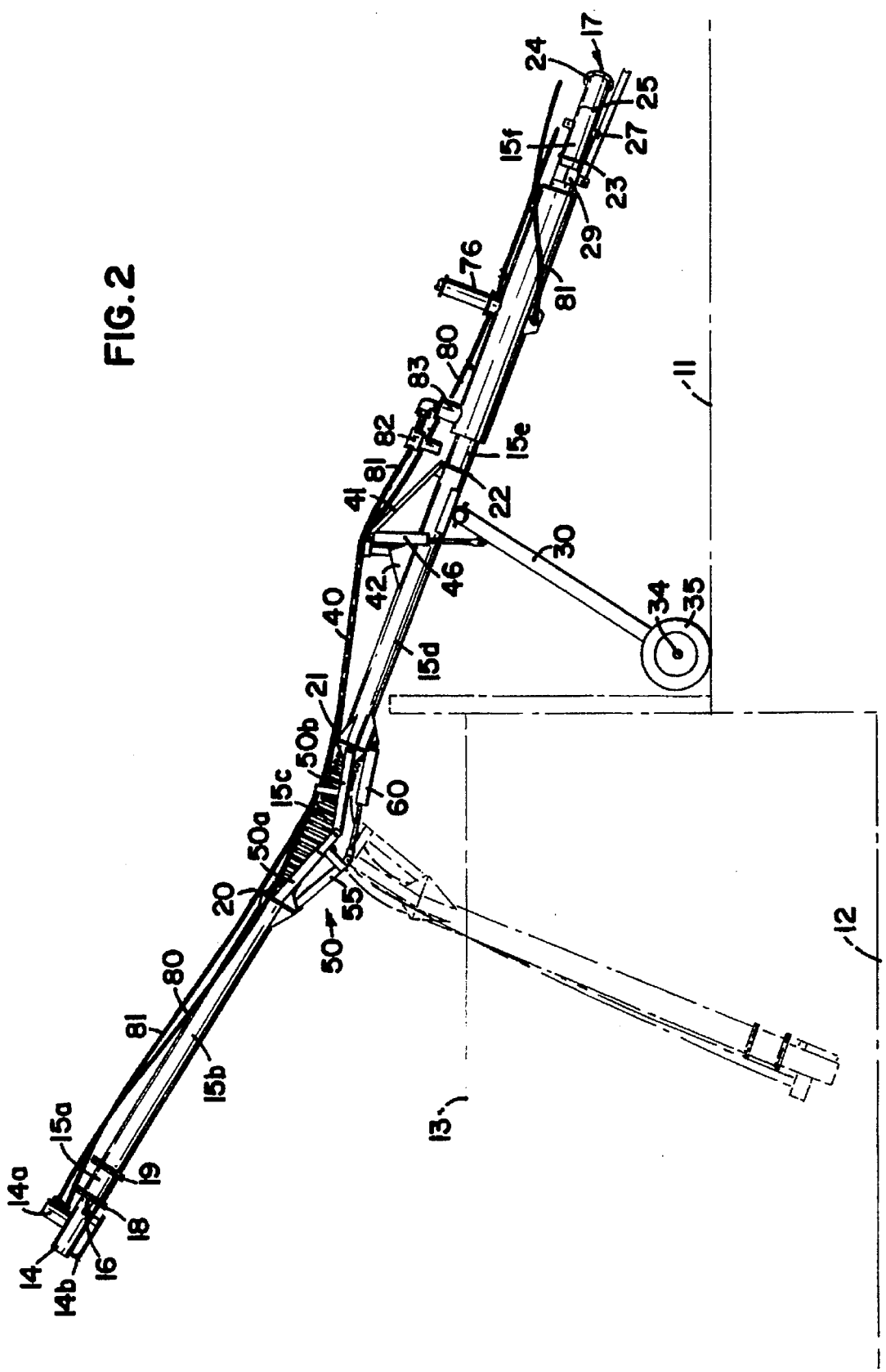
FIG. 2 is a side elevational view of the pump of FIG. 1, illustrated in a first elevated position, and illustrated in phantom in a second elevated position.

Similarly, with reference to FIG. 2, the pump/agitator assembly having relative length dimensions for the various conduit segments, as previously described with respect to the preferred embodiment, is able to be lifted by means of the lift cylinders 46 and the wheel and axle assembly, so as to provide pumping capability over walls as high as 10 feet in height. The flexibility provided by cooperative control of the "height" adjustment of the wheel and axle assembly, in combination with the degree of flexure rendered available by use of the flexible conduit portion 15c and its associated flexure control structure, provides virtually unlimited options for flexibility of use of the pump/agitator apparatus of this invention. For example, besides use in conventional below-grade or elevated reservoir applications as illustrated in FIGS. 1 and 2, the inventive apparatus can also operate efficiently with storage reservoirs having inclined banks, for example having rise to run ratios of 1:1 or even up to 1:3. Further, the maneuverability provided by the steerable wheel/axle assembly enables the pump/agitator assembly 10 to be easily maneuvered, despite its size, in tight quarters and enables the rear conduit portions of the assembly to be easily guided and/or lowered into and through holes in buildings or access ports to existing reservoirs that were configured for other styles of permanent or less portable pump assemblies. Besides its flexibility, the hydraulic cooling feature enables sustained high volume pumping without the need for additional cooling or auxiliary power units to provide the required hydraulic fluid cooling—thus adding to the pump's reliability.

Further, as pointed out above, the apparatus of this invention allows the user a broad range of use-flexibility in selection of the component(s) or implement(s) that are connected to the input 16 and of the pump/agitator apparatus. The user can connect: only a hydraulic pump at the input end, a combination of pump and agitation apparatus, or simply an agitator apparatus—to effect the desired results.

While the invention has been described with respect to several different embodiments thereof, and with respect to specific types and sizes of components used therein, it will be understood by those skilled in the art that the invention is not to be limited in any manner by the specifics of either the embodiments or the components described herein. Such embodiments and components have been described to illustrate clear examples of how the principles of the invention can be specifically applied. All alternatives and modifications of the foregoing are intended to be covered within the scope of the appended claims.

I claim:

1. A towable hydraulic beam apparatus for processing manure slurries, comprising:

(a) a wheeled transport support frame of a type suitable for towing over a support surface and having one end configured for operative detachable connection to a towing vehicle;

(b) an elongated conduit beam mounted to said transport frame and longitudinally extending between first and second oppositely spaced ends; said first end being located near said one end of said transport support frame and said second end being distally positioned therefrom; said conduit beam being generally rigid except for an elongate flexible section lying intermediate said first and second ends; said elongated conduit beam further defining a continuous fluid passageway between said second and said first ends; wherein said second end defines a fluid input end and said first end defines a fluid discharge end;

(c) flex control means operatively connected with said conduit beam for flexibly bending said conduit beam at said flexible section thereby controlling the vertical orientation of said second end of the conduit beam; and (d) hydraulic pump means operatively connected to said conduit beam at said second end thereof for pumping slurry material through said conduit passageway.

2. The apparatus of claim 1, further including nozzle agitation means operatively connected with said pump means and mounted to said elongated conduit beam for providing a directed pressurized jet of pumped slurry material.

3. The apparatus of claim 1, further including hydraulically energized agitation means operatively connected to said conduit beam at said second end thereof, for agitating slurry material external of said second end.

4. The apparatus of claim 1, further including lift means operatively connected to said support frame and said elongated conduit beam for controllably lifting the flexible portion of said conduit beam relative to said support surface.

5. The apparatus of claim 3, wherein said lift means comprises a hydraulically operable lifting structure operatively connected to the wheels of said support frame.

6. The apparatus of claim 1, wherein said flex control means includes a hydraulically operable linkage assembly.

7. The apparatus of claim 1, further including means operatively connected to the wheels of said support frame for controllably steering said wheels.

8. The apparatus of claim 7, wherein said steering means comprising a hydraulically controlled steering mechanism.

9. The apparatus of claim 2, further including cooling means in said conduit beam for cooling hydraulic fluid used by said hydraulic pump by means of the pumped material moving through said conduit passageway.

10. A flexible hydraulic pump apparatus, comprising:

(a) a first generally rigid elongate conduit segment extending between an input end and a second end;

(b) a second generally rigid conduit segment extending between a first end and a discharge end;

(c) an elongate flexible conduit segment operatively connecting the second end of said first conduit segment with the first end of said second conduit segment, thereby defining a continuous fluid flow passageway from said inlet end to said discharge end;

(d) linkage means operatively connecting said first and said second rigid conduit segments adjacent their respective said second and said first ends, for supporting said first conduit segment in cantilevered manner from said first end of said second conduit segment;

(e) flexure means operatively connected to said linkage means for moving said linkage means to controllably change the relative angle between the longitudinal axes of said first and said second conduit segments, thereby bending said flexible conduit segment and controllably moving said input end of said first conduit segment;

(f) hydraulic pump means operatively connected to said first conduit segment at said input end for pumping slurry material through said conduit passageway; and (g) transport towing means operatively connected to said second conduit segment for transportably carrying said connected conduit segments over a support surface.

11. The pump apparatus of claim 10, further including agitator means operatively connected to receive at least a portion of the material pumped by said pump means, for directing an agitation jet back into the material being pumped.

12. The pump apparatus of claim 10, further including lift means operatively connected with said second conduit means for controllably lifting said first end thereof and said first and said flexible conduit segments carried thereby.

13. The pump apparatus of claim 12, wherein said transport towing means includes means, operatively connected to said second conduit segment for retainably maintaining the discharge end of said second conduit means at a relatively constant level, regardless of the lifted position of said first end of the second conduit.

14. The pump apparatus of claim 12, wherein said lift means includes at least one hydraulically energized lift member.

15. The pump apparatus of claim 10, further including cooling means operatively connected with at least one of said conduit segments and to contain hydraulic fluid used to energize said hydraulic pump means, for cooling said hydraulic fluid by heat transfer with the material being pumped through said conduit passageway.

16. The pump apparatus of claim 12, wherein said transport towing means also comprises said lift means.

17. The pump apparatus of claim 12, wherein said transport towing means includes steerable wheel means for controllably maneuvering said pump apparatus over the support surface.

18. The pump apparatus of claim 17, wherein said steerable wheel means includes hydraulically activated linkage means connected to transport wheels.

19. In combination with a towed hydraulic pumping apparatus of the type having a hydraulic pump operatively connected to one end of an elongate conduit having rigid elongate end sections connected by a flexible interconnecting section and through which a slurry material is pumped, an apparatus for lifting and operatively positioning said hydraulic pump relative to said slurry material, comprising:

(a) means operatively connected with said elongate conduit for hydraulically lifting said conduit and attached pump in cantilevered manner over a raised obstacle; and (b) flexure means for controllably bending the conduit at said flexible interconnecting section to lower the pump into a pumping position while maintaining at least a portion of the elongate conduit in overlying relation to the obstacle.

* * * * *